United States Patent
Senda

Patent Number: 5,833,407
Date of Patent: Nov. 10, 1998

[54] METHOD FOR ESTIMATING HEAT-INCLUDED DISPLACMENT IN A MACHINE TOOL

[75] Inventor: Harumitsu Senda, Aichi-ken, Japan

[73] Assignee: Okuma Corporation, Aichi-ken, Japan

[21] Appl. No.: 800,581

[22] Filed: Feb. 18, 1997

[30] Foreign Application Priority Data

Feb. 19, 1996 [JP] Japan .................................. 8-030982

[51] Int. Cl.$^6$ ........................................................ B23C 9/00
[52] U.S. Cl. .................... 409/131; 318/634; 364/474.17; 364/474.35; 409/135
[58] Field of Search .................................. 409/132, 135, 409/231, 239, 131; 318/565, 572, 634; 364/474.17, 474.18, 474.35; 408/4, 13

[56] References Cited

U.S. PATENT DOCUMENTS

| | | | |
|---|---|---|---|
| 3,579,073 | 5/1971 | Johnstone | 318/634 |
| 3,672,246 | 6/1972 | Prewett, Jr. et al. | 318/634 |
| 4,919,575 | 4/1990 | Yoshimi et al. | 364/474.35 |
| 5,444,640 | 8/1995 | Hirai | 364/474.35 |
| 5,523,953 | 6/1996 | Araie et al. | 364/474.35 |
| 5,581,467 | 12/1996 | Yasuda | 364/474.35 |
| 5,619,414 | 4/1997 | Ishii | 364/474.35 |
| 5,623,857 | 4/1997 | Sakuraba | 409/135 |

FOREIGN PATENT DOCUMENTS

| | | | |
|---|---|---|---|
| 58-132441 | 8/1983 | Japan | 409/135 |
| 58-160042 | 9/1983 | Japan | 364/474.35 |
| 60-197346 | 10/1985 | Japan | 364/474.35 |
| 61-297057 | 12/1986 | Japan | 364/474.18 |
| 61-59860 | 12/1986 | Japan . | |
| 63-237104 | 10/1988 | Japan | 364/474.17 |
| H6-22779 | 3/1994 | Japan . | |
| WO 82/00534 | 2/1982 | Russian Federation | 318/565 |

*Primary Examiner*—A. L. Pitts
*Assistant Examiner*—Christopher Kirkman
*Attorney, Agent, or Firm*—Lahive & Cockfield, LLP

[57] ABSTRACT

There is provided a method for estimating the thermal displacement of a component of a machine tool comprising the steps of detecting the temperature of at lease one rotatable component of a machine tool having a variable rotational speed and a variable temperature; converting the detected temperature into a numerical value; and estimating the thermal displacement of the component based on the numerical value using an operational expression which includes a time-varying coefficient.

8 Claims, 5 Drawing Sheets

METHOD FOR ESTIMATING HEAT-INCLUDED DISPLACMENT IN A MACHINE TOOL

BACKGROUND OF THE INVENTION

1. Field of the Invention

The present invention relates to a method for estimating thermal displacement of a component of a machine tool based on temperature information.

2. Description of the Prior Art

Generally, due to its mechanical nature, a machine tool has several heat sources, such as the roller bearings of the main shaft. Heat generated from such sources is conducted to other components of the machine tool, causing thermal displacement of mechanical components. Since such thermal displacement greatly affects the accuracy of machining, various methods for estimating and/or compensating for this thermal displacement in a machine tool have been proposed. One conventional method is to cool the heat sources. Another is to estimate the thermal displacement based on the temperature of a machine tool and then to compensate for this estimated thermal displacement.

An example of the latter method is disclosed in Japanese Published Examined Patent Application No. S61-59860. This particular method includes the steps of measuring the temperatures of the main shaft head and of the body of a machine tool based on outputs of two sensors attached to these two components and estimating the thermal displacement of the main shaft based on the difference between the instantaneous outputs of the two sensors. The relationship between the two sensor outputs and the thermal displacement of the main shaft is obtained experimentally.

Japanese Published Examined Patent Application No. H6-22779 discloses another method that estimates the thermal displacement of the main shaft in the axial direction of a machine tool by using experimentally obtained expressions for the thermal displacement of different elements of the main shaft.

However, because these conventional methods use instantaneous values representative of detected temperatures, they cannot compensate for the delays caused by the time constant of the temperature change and the time constant of the thermal displacement change. Therefore, an estimation error tends to occur when the thermal displacement is in a transient state following a change in the rotational speed of a rotatable component, such as the main shaft. Furthermore, these methods do not take into account a change in the rotational speed of the main shaft when thermal displacement is already in a transient state. Nor do they take into account the fact that the time constants can change as a function of the rotational speed of the main shaft. For these reasons, these known methods fail to accurately estimate thermal displacement under all operational conditions of a machine tool.

SUMMARY OF THE INVENTION

In view of the above-identified problems, an object of the present invention is to provide a method for accurately estimating thermal displacement of a machine tool component under all operational conditions of the machine tool, whether the thermal displacement is in a transient state or in a steady state.

The above object and other related objects are realized by providing a method for accurately estimating thermal displacement of a component of a machine tool. This method comprises the steps of detecting the temperature of at least one component of a machine tool, converting the detected temperature into a numerical value, and using an operational expression to estimate the thermal displacement of the machine tool component based on the numerical value, wherein the operational expression includes a coefficient that changes with time.

The principle of the above method will be explained hereinafter. Generally, when the thermal displacement is in a steady state, for example when the rotational speed of the main shaft is constant, the following expression accurately accounts for the proportional relationship between the thermal displacement of the main shaft and the temperature of the main shaft:

$$\text{Thermal displacement} = K \times \text{temperature} \qquad (1)$$

where K=a coefficient.

It is well known that when the thermal displacement is in a transient state following a change in the rotational speed of the main shaft, the time responses of the temperature and the thermal displacement can be expressed by a first-order lag system. Therefore, conventional methods for estimating thermal displacement based on an instantaneous value representing temperature measurement often inaccurately estimate thermal displacement in a transient state.

To make the time response of the temperature change coincide with the time response of the thermal displacement when the thermal displacement is in a transient state, filtering is performed on the measured temperature data of a target machine tool component, such as the main shaft. Preferably, a digital filter such as an exponential smoothing filter can be used for this purpose. Then, a tentative value for an estimate of the thermal displacement is given by the following operational expression:

$$Y_n = Y_{n-1} + (X_n - X_{n-1}) \times \alpha \qquad (2)$$

where $X_n$=temperature data in from the nth measurement,
$Y_n$=nth tentative value for estimation of heat-induced displacement, and
$\alpha$=filter coefficient.

As shown in FIG. 1, the same dead time appears in the time response of the estimated thermal displacement whether the filter coefficient, $\alpha$, is kept constant or whether first order lag system temperature data is input into the first order system. Consequently, the estimate of the thermal displacement is still inaccurate. Therefore, according to the present invention, a time varying function f(n) is used as the filter coefficient $\alpha$. The coefficient $\alpha$ is changed with time to an optimum value in which the difference between the estimated thermal displacement and the thermal displacement model is small even when the thermal displacement is in a transient state (see FIG. 2). FIG. 3 shows the filter coefficient that changes by the function f(n). The following operational expression is thus established:

$$Y_n = Y_{n-1} + (X_n - X_{n-1}) \times f(n) \qquad (3)$$

Then, the tentative value for the estimate as given by the expression (3) is substituted for the temperature in expression (1) to estimate the thermal displacement. In this way, as shown in FIG. 2, the estimated displacement can coincide with the displacement model even when the displacement is in a transient state. It should be noted that the filter coefficient $\alpha$ may be replaced with a function that changes with time, with the temperature data sampling interval, or with the number of estimation operations performed thus far.

The function f(n) is subject to change depending on the time constants of the temperature and of the thermal displacement. Furthermore, these time constants are subject to significant change due to many factors. One such factor is that the mechanism for heat generation and heat transfer for a deaccelerating main shaft differs from that of an accelerating main shaft. Another factor is that heat radiation gradually changes as the rotational speed of the main shaft decreases.

In one aspect of the invention, the filter coefficient starts to change when a change occurs in the rotational speed of a component, such as the main shaft, or when a command to change the rotational speed is issued.

In another aspect, to further enhance the accuracy of estimation, the method according to the present invention monitors the temperature change of the main shaft whenever the rotational speed changes. The method then determines the change in the filter coefficient depending on whether the temperature has risen or fallen and according to whether a command has been issued to change the rotational speed. FIG. 4 shows how the filter coefficient changes as the rotational speed decreases.

If the main shaft is rotated by a built-in motor, heat generated by the motor also affects the thermal displacement. Accordingly, in yet another aspect, the method according to the invention monitors the output of a motor and starts to change the filter coefficient when the output of the motor exceeds a threshold value.

The rotational speed of a machine tool component may change when the thermal displacement is already in a transient state. Both the temperature and the thermal displacement of the component exhibit a first-order lag response to the rotational speed of the component. Therefore, as shown in the model of FIG. 5, the thermal displacement can be accurately estimated by expression (3) in a period A in which the displacement is not in a steady state but in a transient state due to a change in rotational speed. In a period B, following another change in rotational speed, the displacement is in a transient state and the temperature and the thermal displacement decrease. Since in period A the temperature data is higher than the above-described tentative value for estimation in period A, the tentative value in period B is pulled up by the higher temperature and remains higher than the displacement model in the period B, thereby causing an estimation error.

In still another aspect of the present invention, to eliminate such an estimation error, the estimation method: determines whether there is a change in rotational speed while the thermal displacement is in a transient state; determines the gap between the tentative value given by the expression (3) and the temperature data preceding the change; and, after the change in rotational speed, estimates the thermal displacement by substituting the most recently sampled temperature data with a gap absorption value added thereto into the expression (3). Preferably, the gap absorption value is calculated by including in the calculation a temperature time constant and the time elapsed since the change in the rotational speed. The following expressions account for the above processing:

Gap=temperature data preceding rotational speed change−tentative value for displacement estimation (4)

Temperature data for substitution=current temperature data−Gap×exp (−t/Ttmp) (5)

where "temperature data for substitution" corresponds to $X_n$ in expression (3), "t" is the elapsed time from a change in the rotational speed, and "Ttmp" is a temperature time constant.

FIG. 6 shows an estimation model to which this gap absorption processing is applied. This estimation model indicates that accurate estimation is performed.

It should be noted that optimum filter coefficients may be stored in memory in advance.

DETAILED DESCRIPTION OF THE PREFERRED EMBODIMENTS

A machining center embodying the present invention will be explained hereinafter with reference to the attached drawings.

Figure 1:
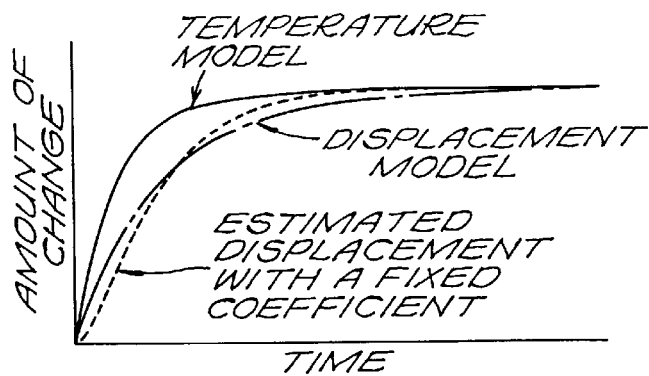
FIG. 1 is a graph showing an estimate of thermal displacement obtained by an operational expression having a fixed filter coefficient.
Figure 2:
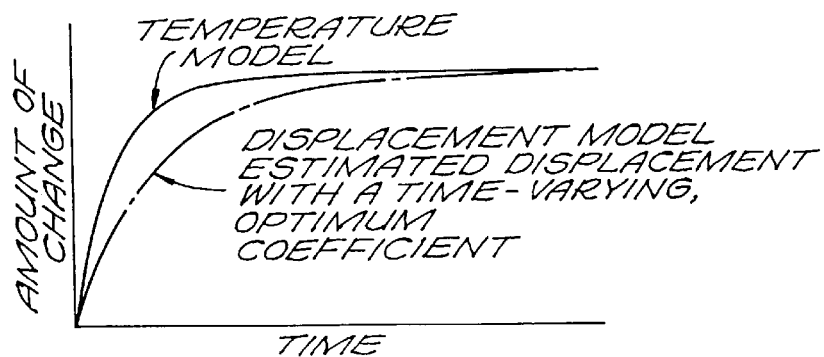
FIG. 2 is a graph showing an estimate of thermal displacement obtained by an operational expression having an optimum filter coefficient.
Figure 3:
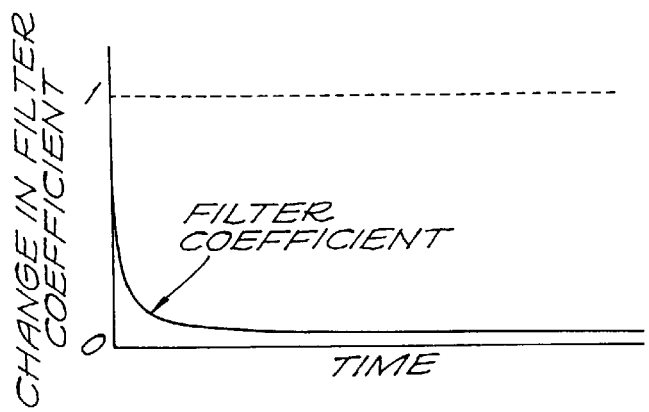
FIG. 3 is a graph showing a change in a filter coefficient with time.
Figure 4:
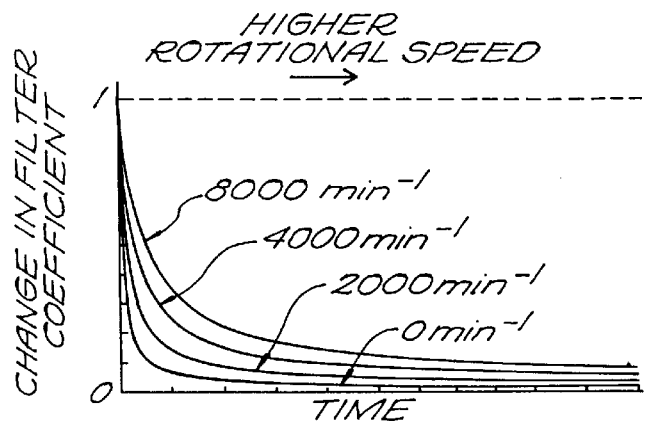
FIG. 4 is a graph showing a change in a filter coefficient with time as the rotational speed of a main shaft decreases.
Figure 5:
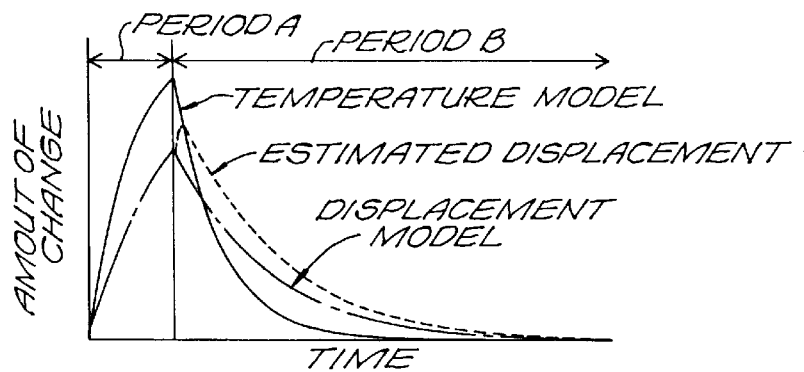
FIG. 5 is a graph showing an estimation error that occurs when the rotational speed of a main shaft changes while the thermal displacement is in a transient state.
Figure 6:
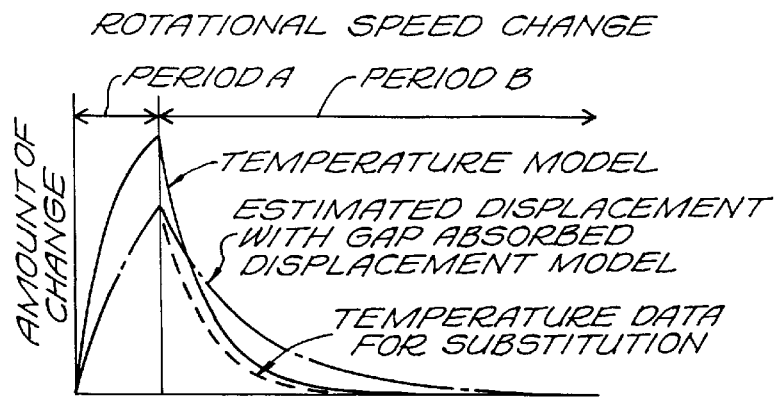
FIG. 6 is a graph showing the result of a method according to the invention for estimating thermal displacement following a change in the rotational speed of a main shaft while the thermal displacement is in a transient state.
Figure 7:
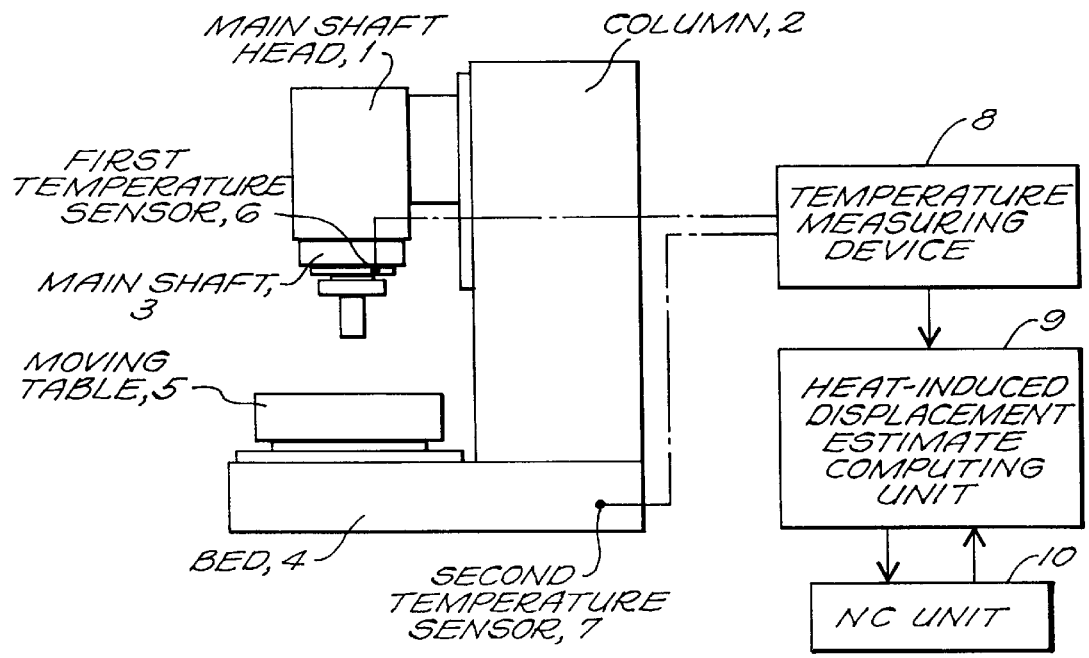
FIG. 7 is a schematic representation of a vertical machine center connected to a thermal displacement compensation system for carrying out a method of an embodiment in accordance with the present invention.

FIG. 7 shows a vertical machining center 100 which incorporates a thermal displacement compensation system including first and second temperature sensors 6 and 7, a temperature measuring device 8, a thermal displacement estimate computing unit 9, and a numerical control unit 10. It should be noted that the same system is also applicable to a horizontal machining center. The vertical machining center 100 includes a main shaft head 1, a column 2, a main shaft 3, a bed 4, and a moving table 5. The first temperature sensor 6 is attached to and measures the temperature of the main shaft. Likewise, the second temperature sensor 7 is attached to the bed 4 for measuring a reference temperature. The temperature measuring device 8 is coupled to the two temperature sensors 6 and 7 so as to receive analog signals representative of the measured temperatures of the main shaft 3 and of the bed 4 as measured by the sensors 6 and 7.

The temperature measuring device 8 also converts the analog signals into numerically expressed digital signals representing the temperatures of the main shaft 3 and the bed 4. The thermal displacement estimate computing unit 9 is coupled to the temperature measuring device 8 and calculates the temperature data representing the difference between the numerically expressed temperatures of the main shaft 3 and of the bed 4. Then, the thermal displacement estimate computing unit 9 estimates the thermal displacement of the main shaft based on this temperature data. Next, the thermal displacement estimate computing unit 9 calculates the correction value based on this temperature data. The numerical control unit 10, which is coupled to the computing unit 9, then compensates for the thermal displacement of the main shaft 3 based on the correction value in a manner known in the art.

Figure 8:
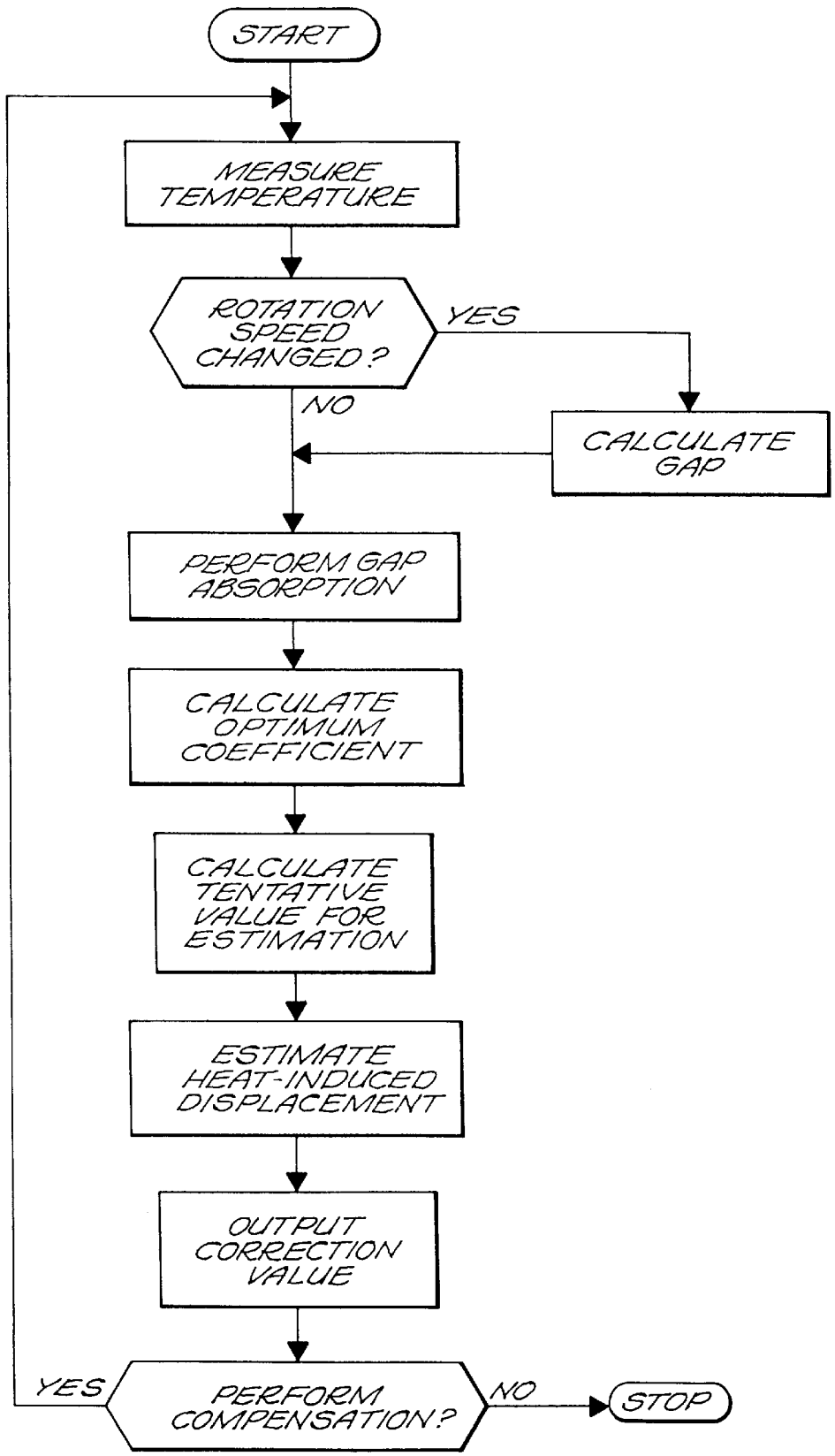
FIG. 8 is a flowchart representing a method of the embodiment for estimating the thermal displacement of a main shaft.

FIG. 8 is a flowchart of the process of compensating for the thermal displacement of the main shaft 3. This displacement compensation process includes the method of this embodiment for estimating the thermal displacement of the main shaft.

If the rotational speed of the main shaft 3 changes while the aforementioned thermal displacement compensation method (which includes a step of measuring the temperatures of the main shaft 3 and of the bed 4) is carried out, the gap between the temperature data representing the difference between the temperatures of the bed and of the main shaft and the tentative value for the estimate of the thermal displacement is given by the expression (4). Then, the temperature data for substitution is determined by the expression (5) based on this gap, the lapsed time from the rotational speed change, and the temperature time constant. As mentioned above (see expression (5)), this temperature data for substitution has a gap absorption value added thereto. When the gap has become insignificant enough not to affect the calculation of the estimate of the thermal displacement, this gap absorption processing step may be omitted. Then, an optimum filter coefficient is calculated by a predetermined operational expression based on the time elapsed since the change in rotational change or on the number of compensation operations carried out since the change in rotational speed. Then, a tentative estimate of the thermal displacement is calculated using the expression (3) based on the optimum filter coefficient and on the temperature data for substitution. As the next step, the thermal displacement is estimated by substituting the tentative estimate for the thermal displacement for the temperature in expression (1). Finally, the correction value corresponding to this estimate of the thermal displacement is output to the numerical control unit 10 for subsequent compensation for the thermal displacement.

Figure 9:
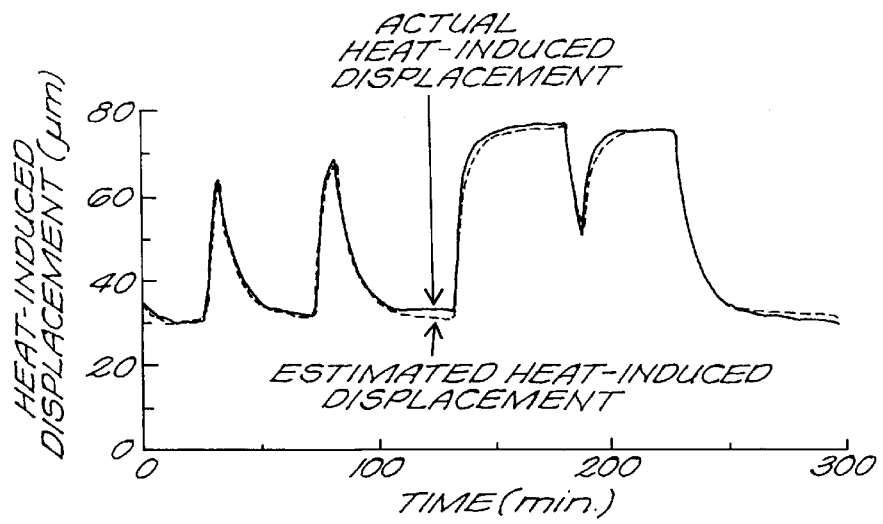
FIG. 9 is a graph comparing an estimate, by the method of the present-invention, of the thermal displacement of a main shaft with the experimentally measured thermal displacement of the same main shaft.

An experiment was conducted to compare the actual thermal displacement of the main shaft 3 with the estimate obtained by the method in accordance with the present invention. FIG. 9 is a graph showing the result of the experiment. FIG. 9 clearly demonstrates that the estimate of thermal displacement substantially coincides with the actual value.

Figure 10:
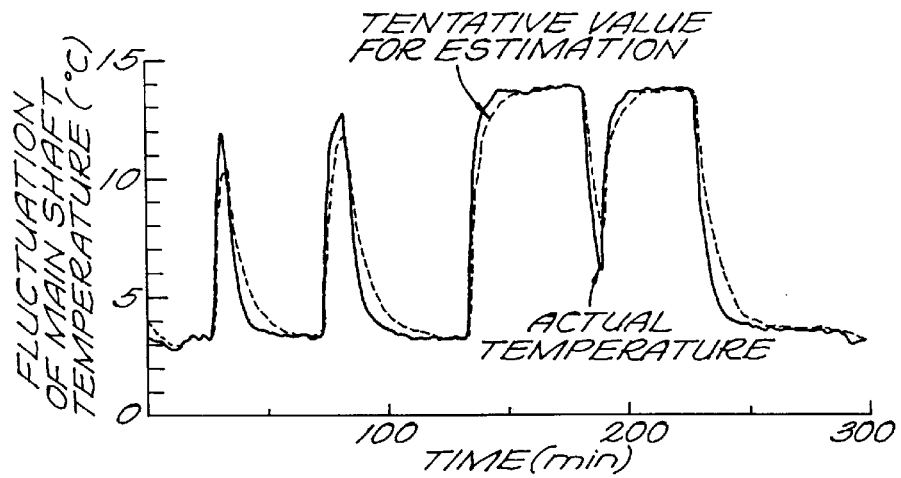
FIG. 10 is a graph showing how the temperature of the main shaft and the tentative estimate of its thermal displacement fluctuated with time during the experiment of FIG. 9.
Figure 11:
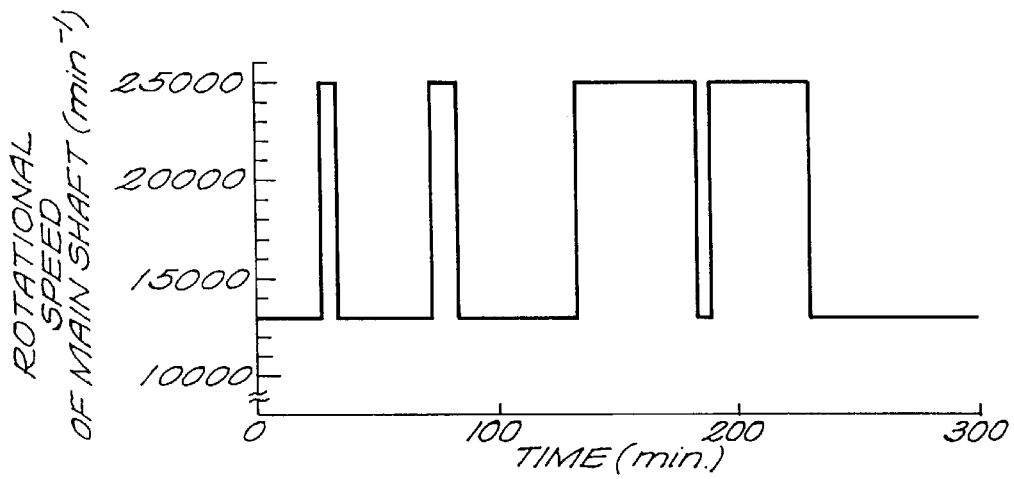
FIG. 11 is a graph showing the fluctuation of the rotational speed of the main shaft during the experiment of FIG. 9.
Figure 12:
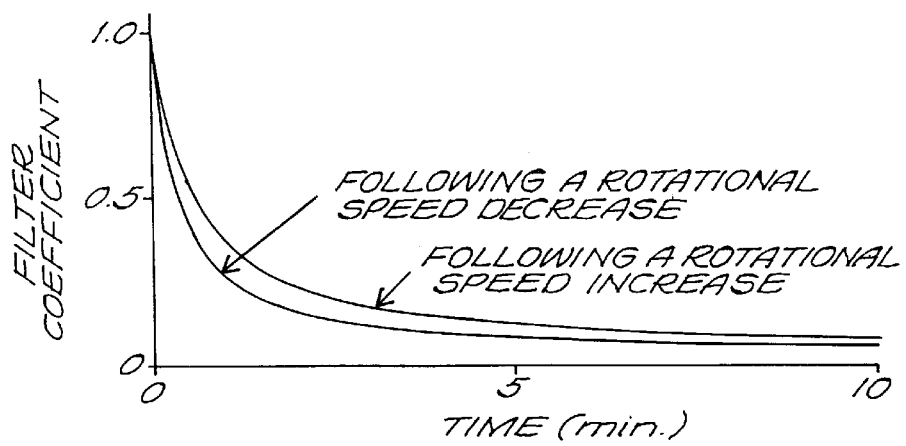
FIG. 12 is a graph showing how the filter coefficient was changed with time during the experiment of FIG. 9.

FIG. 10 is a graph showing how the temperature of the main shaft 3 and the tentative estimate of the thermal displacement changed with time during the experiment. FIG. 11 is a graph showing the change in the rotational speed of the main shaft 3 during the experiment. FIG. 12 is a graph showing how the filter coefficient was changed with time following each rotational speed change during this experiment. FIG. 12 also shows two different coefficient curves, one applied upon an increase in the rotational speed of the main shaft 3 and the other applied upon a decrease in the rotational speed of the main shaft.

As there may be many other modifications, alterations, and changes without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A method for estimating the thermal displacement of a rotatable component of a machine tool, said method comprising the steps of:

(A) generating a signal representative of the temperature of at least one rotatable component of said machine tool, said at least one rotatable component having a variable rotational speed and a variable temperature;

(B) converting said signal representative of said temperature into a numerical value; and (C) estimating the thermal displacement of said at least one rotatable component based on said numerical value using an operational expression wherein said operational expression includes a time-varying coefficient.

2. The method in accordance with claim 1 wherein said time-varying coefficient starts to change when a change occurs in said variable rotational speed of said at least one rotatable component.

3. The method in accordance with claim 2 wherein said time-varying coefficient changes in a manner determined by whether said temperature has risen or fallen and whether a command has been issued to change said variable rotational speed.

4. The method in accordance with claim 1 wherein said time-varying coefficient starts to change when a command to change said variable rotational speed of said at least one rotatable component is issued.

5. The method in accordance with claim 4 wherein said time-varying coefficient changes in a manner determined by whether said temperature has risen or fallen and whether a command has been issued to change said variable rotational speed.

6. The method in accordance with claim 1 wherein said machine tool includes a motor having a variable output and said time-varying coefficient starts to change when said variable output of said motor exceeds a threshold value.

7. The method in accordance with claim 1 wherein the step of estimating the thermal displacement further comprises the steps of:

(a) determining, if said variable rotational speed changes, a gap between an estimated thermal displacement given by said operational expression and a value representative of a temperature obtained immediately before said change in said variable rotational speed; and (b) estimating the thermal displacement of said at least one rotatable component by substituting into said operational expression a numerical value representing the current temperature of said at least one rotatable component, said numerical value incorporating a value for absorbing said gap.

8. The method in accordance with claim 7, wherein said value for absorbing said gap is calculated by including in the calculation a temperature time constant and a time elapsed since said change in said variable rotational speed.

* * * * *